US012689494B2

(12) United States Patent　　(10) Patent No.: US 12,689,494 B2
Nemeth et al.　　(45) Date of Patent: Jul. 21, 2026

(54) METHODS FOR SBFD-UE REPORTING ON FULL-DUPLEX HARD CONSTRAINTS

(71) Applicant: MediaTek Singapore Pte. Ltd., Singapore (SG)

(72) Inventors: Jozsef Gabor Nemeth, Cambridge (GB); Mohammed S Aleabe Al-Imari, Cambridge (GB); Francesc Boixadera-Espax, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 331 days.

(21) Appl. No.: 18/432,100

(22) Filed: Feb. 5, 2024

(65) Prior Publication Data

US 2024/0283619 A1　　Aug. 22, 2024

Related U.S. Application Data

(60) Provisional application No. 63/485,548, filed on Feb. 17, 2023.

(51) Int. Cl.
| | |
|---|---|
| *H04L 5/00* | (2006.01) |
| *H04L 5/14* | (2006.01) |
| *H04L 5/16* | (2006.01) |
| *H04W 72/566* | (2023.01) |

(52) U.S. Cl.
CPC .......... *H04L 5/0094* (2013.01); *H04L 5/0064* (2013.01); *H04L 5/1461* (2013.01); *H04L 5/16* (2013.01); *H04W 72/569* (2023.01)

(58) Field of Classification Search
CPC ... H04L 5/0094; H04L 5/0064; H04L 5/1461; H04L 5/16; H04L 5/0044; H04L 5/14; H04W 72/569
See application file for complete search history.

(56) References Cited

U.S. PATENT DOCUMENTS

| | | | |
|---|---|---|---|
| 2012/0026986 A1* | 2/2012 | Dass | H04W 72/542 |
| | | | 370/336 |
| 2018/0123710 A1 | 5/2018 | Kim et al. | |
| 2020/0336890 A1* | 10/2020 | Abedini | H04B 7/0697 |
| 2022/0247468 A1 | 8/2022 | Huang et al. | |
| 2022/0394732 A1 | 12/2022 | Hosseini et al. | |
| 2025/0211404 A1* | 6/2025 | Zhu | H04L 5/0044 |

OTHER PUBLICATIONS

European Patent Office, Extended European Search Report in European Patent Application No. 24156513.4-1206, Jul. 18, 2024.
European Patent Office, Communication pursuant to Article 94(3) EPC in EP Application No. 24156513.4, Apr. 28, 2025.

* cited by examiner

*Primary Examiner* — Kibrom T Hailu
(74) *Attorney, Agent, or Firm* — Andy M. Han; Han IP PLLC

(57)　　ABSTRACT

Techniques pertaining to subband full duplex (SBFD) user equipment (UE) reporting hard constraints on full-duplex scheduling to network nodes are described. Such techniques include establishing full-duplex communication between a UE and a network node such that the UE is able to transmit data to the network node and receive data from the network node simultaneously in time. The techniques further include reporting by the UE to the network node one or more hard constraints on a full-duplex scheduling of communication resources that is performed by the network node for the UE during the full-duplex communication.

18 Claims, 8 Drawing Sheets

Figure 8:
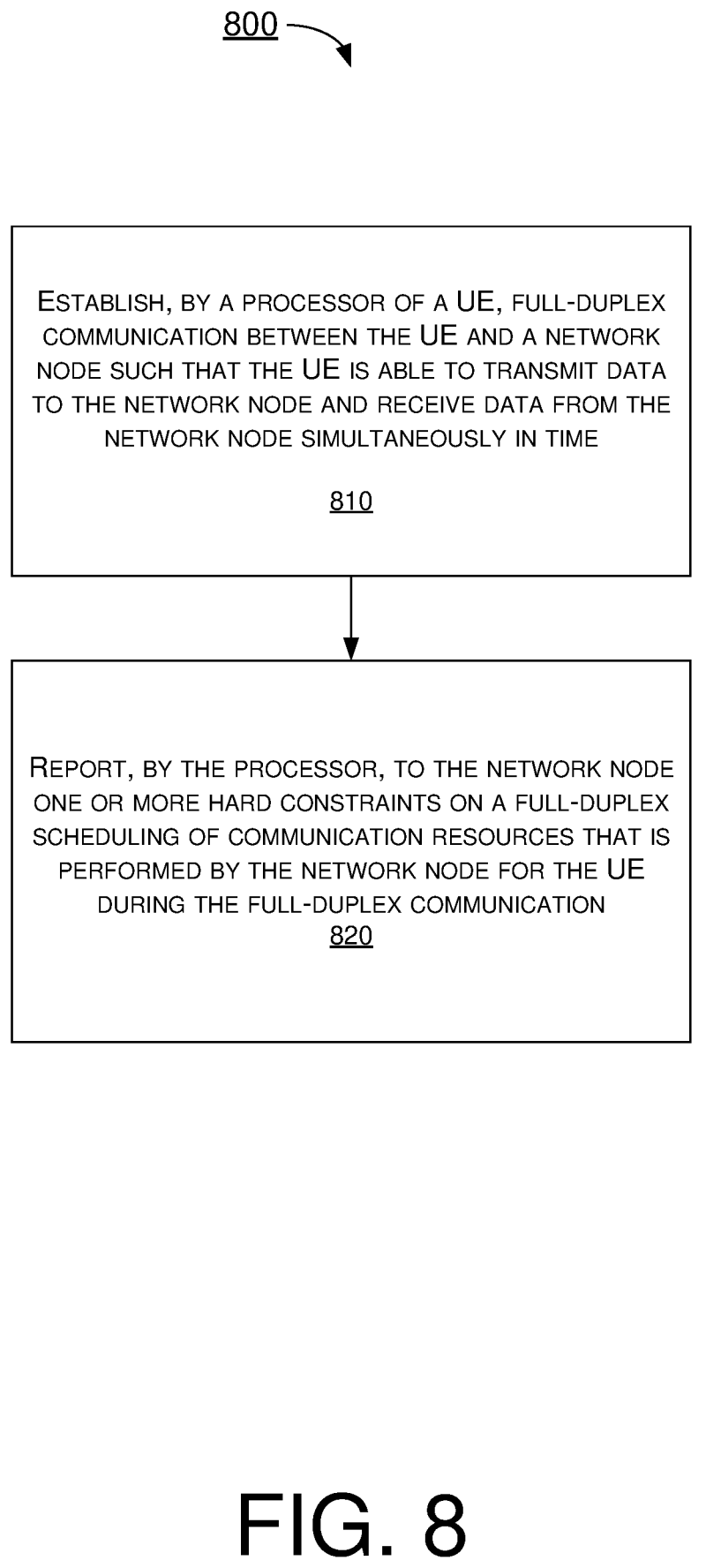

800 ⌐

ESTABLISH, BY A PROCESSOR OF A UE, FULL-DUPLEX COMMUNICATION BETWEEN THE UE AND A NETWORK NODE SUCH THAT THE UE IS ABLE TO TRANSMIT DATA TO THE NETWORK NODE AND RECEIVE DATA FROM THE NETWORK NODE SIMULTANEOUSLY IN TIME

810

REPORT, BY THE PROCESSOR, TO THE NETWORK NODE ONE OR MORE HARD CONSTRAINTS ON A FULL-DUPLEX SCHEDULING OF COMMUNICATION RESOURCES THAT IS PERFORMED BY THE NETWORK NODE FOR THE UE DURING THE FULL-DUPLEX COMMUNICATION

METHODS FOR SBFD-UE REPORTING ON FULL-DUPLEX HARD CONSTRAINTS

CROSS REFERENCE TO RELATED PATENT APPLICATION(S)

The present disclosure is part of a non-provisional application claiming the priority benefit of U.S. Patent Application No. 63/485,548, filed 17 Feb. 2023, the content of which herein being incorporated by reference in its entirety.

TECHNICAL FIELD

The present disclosure is generally related to mobile communications and, more particularly, to techniques for user equipment (UE) configuration and scheduling in sub-band full duplex (SBFD) networks.

BACKGROUND

Unless otherwise indicated herein, approaches described in this section are not prior art to the claims listed below and are not admitted as prior art by inclusion in this section.

In 3GPP Release 19, SBFD-UEs are full-duplex, meaning that such UEs are able to transmit and receive data simultaneously over resources that overlap in time. Prior to 3GPP Release 19, UE are half-duplex, this means that while gNodeBs are able to transmit and receive data simultaneously at any given time, UEs are capable of only transmitting or receiving data at any given time. Thus, SBFD-UEs under 3GPP Release 19 are able to provide higher maximum user throughput with two-way data and lower latency. Additionally, such SBFD-UEs may also provide extra hybrid automatic repeat-request (HARQ) downlink (DL) retransmission opportunities with downlink packets. These advantages may be especially useful in latency-critical applications, such as video streaming in virtual reality (VR) or extended reality (XR) environments.

Under Release 19, the gNodeBs may use frequency-domain resource allocation (FDRA), i.e., full-duplex scheduling, to schedule resources for the SFBD-UEs such that the UEs are able to communicate with the gNodeBs. For example, FDRA may be used to allocate an uplink (transmit) subband of a carrier frequency to a UE for the UE to transmit data to the gNodeB and a downlink (receive) subband of a carrier frequency to the UE For the UE to receive data from the GNodeB, in which the transmit and the receive of the data occur in the same symbol in time. Further, the uplink subband and the downlink subband may be separated by a self-interference cancellation (SIC) guardband of the carrier frequency to guard against harmful interference between the uplink subband and the downlink subband. Thus, the FDRA parameters may form a triplet that is in the form of (TX bandwidth, SIC-guardband, RX bandwidth).

However, in many instances, SBFD-UEs may need to coordinate with the gNodeBs in order to perform full-duplex communications with the gNodeBs. Otherwise, the UEs may actually experience degradations in performance. Accordingly, there is a need for a solution that enables UEs to provide useful information that assists gNodeBs in performing full-duplex resource allocation to the UEs.

SUMMARY

The following summary is illustrative only and is not intended to be limiting in any way. That is, the following summary is provided to introduce concepts, highlights, benefits, and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issue(s) described herein. More specifically, various schemes proposed in the present disclosure are believed to provide solutions involving techniques for UE configuration and scheduling in SBFD networks.

In one aspect, a method may include establishing full-duplex communication between a UE and a network node such that the UE is able to transmit data to the network node and receive data from the network node simultaneously in time. The method may further include reporting by the UE to the network node one or more hard constraints on a full-duplex scheduling of communication resources that is performed by the network node for the UE during the full-duplex communication.

In another aspect, an apparatus implementable in a network as a UE may include a transceiver and a processor coupled to the transceiver. The transceiver may be configured to communicate wirelessly. The processor may be configured to establish full-duplex communication between the UE and a network node such that the UE is able to transmit data to the network node and receive data from the network node simultaneously in time. Subsequently, the processor may be configured to report to the network node one or more hard constraints on a full-duplex scheduling of communication resources that is performed by the network node for the UE during the full-duplex communication.

It is noteworthy that, although the description provided herein may be in the context of certain radio access technologies, networks, and network topologies such as 5G/NR/ Beyond Fifth-Generation (B5G) mobile communications, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet-of-Things (IoT), Narrow Band Internet of Things (NB-IoT), Industrial Internet of Things (IIoT), vehicle-to-everything (V2X), and non-terrestrial network (NTN) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 8 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that the description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to techniques for UEs to report hard constraints on full-duplex scheduling to network nodes, such as gNodeBs. According to the present disclosure, a number of possible solutions may be implemented separately or jointly. That is, although these possible solutions may be described below separately, two or more of these possible solutions may be implemented in one combination or another.

Figure 1:
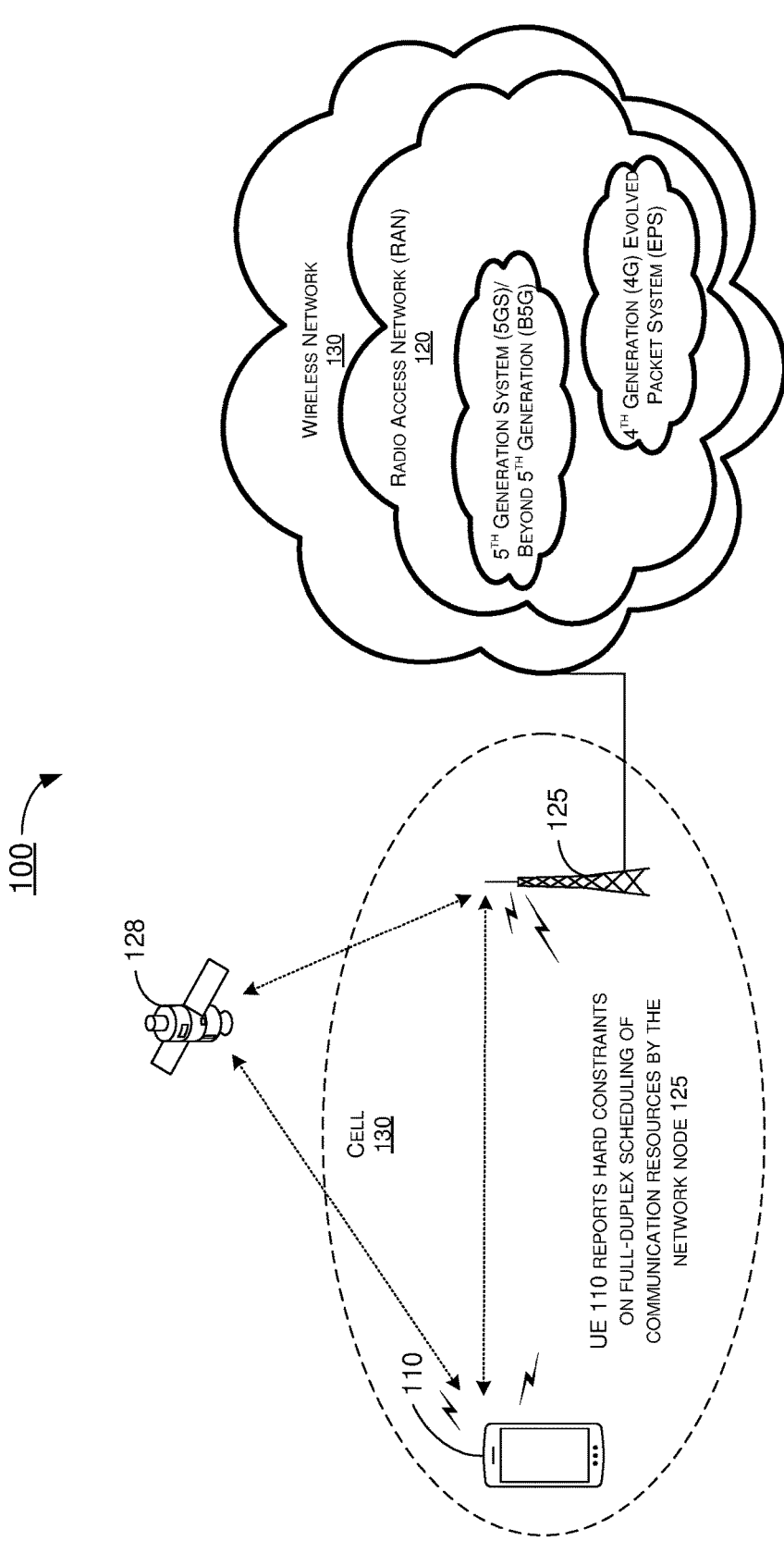
FIG. 1 is a diagram of an example network environment in which various proposed schemes in accordance with the present disclosure may be implemented.

FIG. 1 illustrates an example network environment 100 in which various solutions and schemes in accordance with the present disclosure may be implemented. FIG. 2-FIG. 8 illustrate examples of implementation of various proposed schemes in network environment 100 in accordance with the present disclosure. The following description of various proposed schemes is provided with reference to FIG. 1-FIG. 8.

As shown in FIG. 1, network environment 100 may include a UE 110 in wireless communication with a RAN 120 (e.g., a 5G mobile network, a B5G mobile network or another type of network such as an NTN). UE 110 may be in wireless communication with RAN 120 via a network node 125 (e.g., an eNodeB, gNodeB, or transmit-receive point (TRP)). RAN 120 may be a part of a network 130. In network environment 100, UE 110 and network 130 (via network node 125 of RAN 120) may implement various schemes pertaining to techniques for UE hard constraint reporting in SBFD networks, as described below.

For many SBFD-UE implementations, a UE may need to impose hard constraints on the full-duplex communication resource allocation, i.e., the FDRA performed by a network node, such as a gNodeB. For example, some UE implementations may isolate transmission by low-pass and/or high-pass filter, thereby requiring a minimum SIC-guardband for gain transition. In other UE implementations, a UE may be configured to use downlink-uplink-downlink (DUD) or uplink-downlink-uplink (UDU) carrier frequency partitions, thereby requiring the use of band-pass filters. Thus, the hard constraints that are reported by a UE to a network node may include a required minimum frequency separation between the transmit and receive subbands, a maximum transmission allocation bandwidth, etc. As used herein, a hard constraint refers to a constraint for which a violation may result in unpredictable and abrupt consequences to the performance of the UE, in which such consequences cannot be mitigated by adjustments to the transmission power of the UE.

For example, the UE 110 may report hard constraints that include one or more available minimum SIC-guardband configurations, such as their size and position, etc. to the network node 125. The one or more available minimum SIC-guardband configurations may be specific to the UE implementation of the UE, such as filter configurations of the UE. In turn, when the network node 125 receives the multiple available minimum SIC-guardband configurations from a UE, the network node 125 may implicitly select one of the multiple available minimum SIC-guardband configurations based on scheduling information of the corresponding uplink and downlink bandwidth allocations. In another example, the UE 110 may report limitations on transmit allocation bandwidth and/or receive allocation bandwidth to the network node 125.

It is noteworthy that, although various proposed schemes, options, and approaches may be described individually below, in actual applications these proposed schemes, options, and approaches may be implemented separately or jointly. That is, in some cases, each of one or more of the proposed schemes, options, and approaches may be implemented individually or separately. In other cases, some or all of the proposed schemes, options, and approaches may be implemented jointly.

Figure 2:
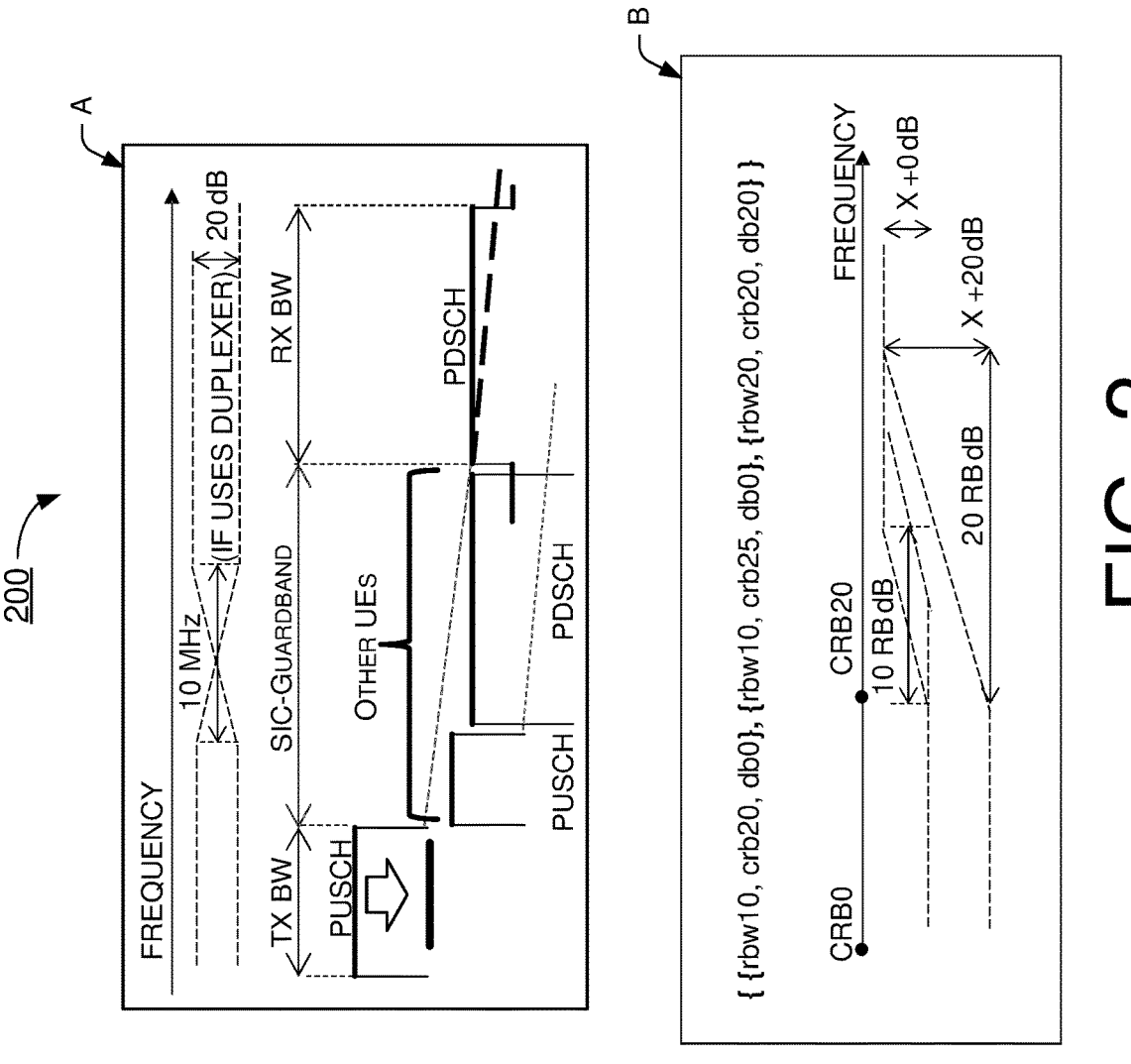
FIG. 2 illustrates a first aspect of an example proposed scheme in accordance with the present disclosure.

FIG. 2 illustrates a first aspect 200 of an example proposed scheme in accordance with the present disclosure. In such a scheme, a UE may report the parameters of the minimum SIC-guardband, such as its size and position, to a network node (e.g., gNodeB). Such parameters may correspond to a hardware configuration option of the UE. However, if the UE determines that there are multiple hardware configuration options available, the UE may report the parameters that correspond to each hardware configuration option to the network node. As used herein, "minimum SIC-guardband" refers to the UE implementation-specific minimum frequency separation between transmit and receive bandwidth allocations (even for moderate transmission power) that is required for full-duplex feasibility. This means that link adaptation can predict the performance of the SIC-guardband while the signal-to-Interference-plus-noise ratio (SINR) losses are bounded. As illustrated in Part (A) of FIG. 2, a minimum SIC-guardband may separate a transmission bandwidth (TxBW) allocation and a receive bandwidth (TxBW) allocation for a UE, in which the minimum SIC-guardband may be used by other UEs for uplinks and downlinks.

In turn, when the UE reports multiple configuration options for the minimum SIC guardband and UE full-duplex is enabled, the network node may implicitly select the best suitable option by scheduling information of the corresponding uplink and downlink bandwidth allocations. However, if none of the options meet the schedule frequency separation, then the network node may implement intra-UE prioritization between the transmission and the reception. Alternatively, instead of the implicit selection, a particular SIC guardband configuration option may be explicitly selected by the network node.

In the example illustrated in Part (B) of FIG. 2, the UE may report several minimum SIC-guardband (GB) configuration options: {{rbw10, crb20, db0}, {rbw10, crb25, db0}, {rbw20, crb20, db20}}, in which the first value in each triplet is a size of the SIC-guardband, the second value is a starting position of the SIC GB, and the third value is the relative performance rating of the SIC-guardband with respect to the other SIC GB configuration options. This means that a 10-resource block (RB)-wide minimum SIC-guardband (which provides zero dB additional transmit-receive (TX-RX) isolation performance) that starts at common resource block (CRB) index #20 or CRB index #25 may be selected, or a 20 RB-wide minimum SIC-guardband starting at CRB index #20 can be selected to provide 20 dB additional (TX-RX) isolation performance. Thus, the scheduler of the network node may be informed of the three options. In turn, the scheduler may select one of the multiple options based on the scheduling information of the corresponding uplink and downlink bandwidth allocations, e.g., frequency allocation of the uplink subband used for data transmission (Tx) by the UE (referenced in FIG. 2 as transmission bandwidth (TxBW)) and the downlink subband used for data reception (Rx) by the UE (referenced in FIG. 2 as reception bandwidth (RxBW)). However, if none of the options meets the scheduled frequency separation requirement for the uplink bandwidth allocation and the downlink bandwidth allocation, the scheduler of the network node may use intra-UE prioritization between the transmission and reception of data for the UE. For example, either the data transmission or the data reception by the UE may be dropped. Alternatively, the schedule of the network node may select one of the multiple options based on An additional feature of the proposed scheme may be that the UE may report one or more SBFD-UE capability classes to which it belongs. For example, the SBFD-UE capability classes may include (1) a first UE class that specifies a predetermined minimum SIC-guardband necessary for the UE in full-duplex operation; (2) a second UE class that specifies a predetermined maximum Tx bandwidth necessary for the UE in full-duplex operation; (3) a third UE class that specifies a predetermined maximum combined bandwidth of full-duplex operation; and (4) a fourth UE class that specifies a predetermined minimum SIC guardband (and/or maximum Tx bandwidth and/or maximum Rx bandwidth) requirements with respect to a specified admissible transmit power for which a SINR loss target is met with confidence. Each of the UE classes may specify restrictions on the supported combinations of the smallest SIC-guardband and largest Tx or Rx bandwidth.

Figure 3:
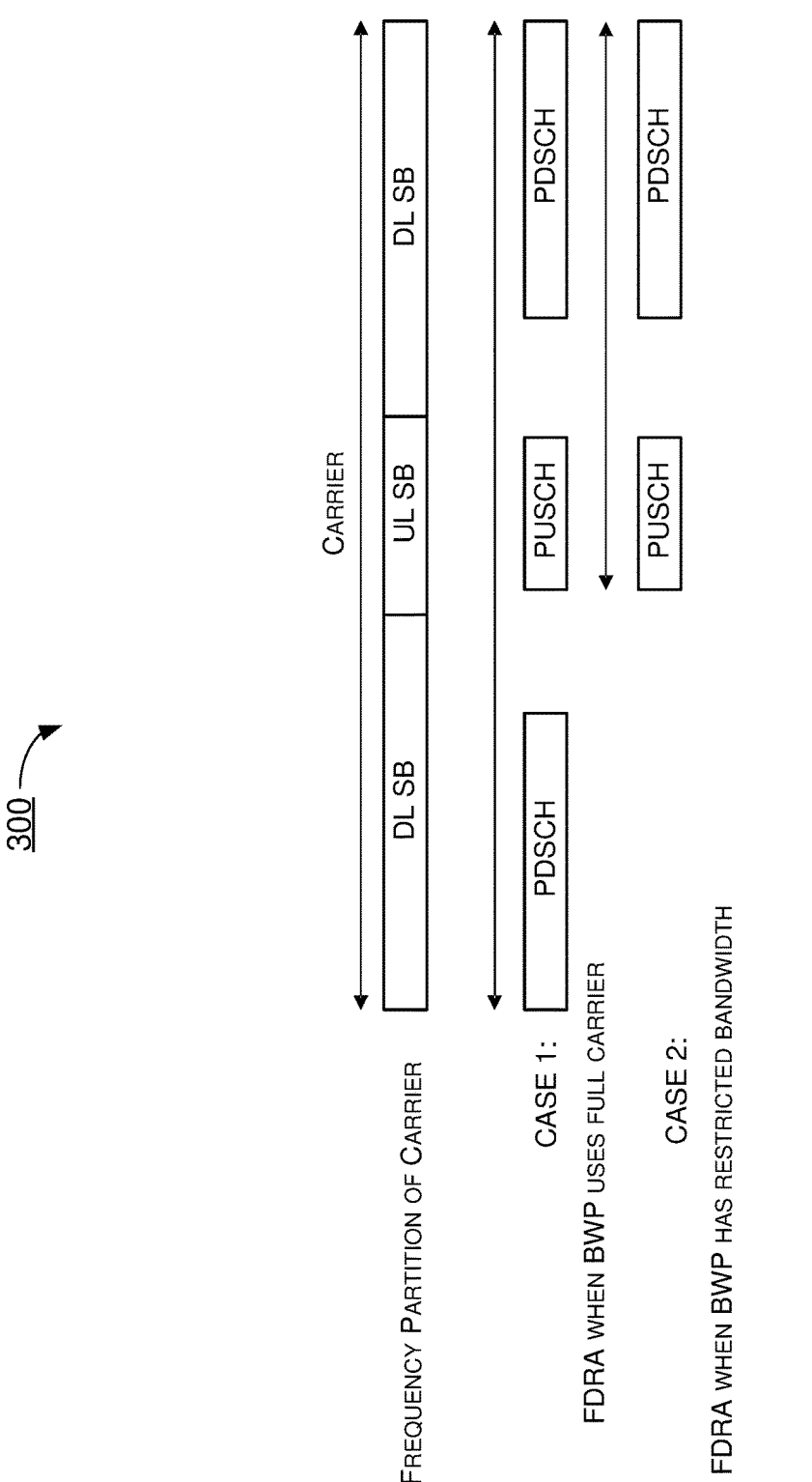
FIG. 3 illustrates additional implementation details of the proposed scheme in accordance with the present disclosure.

FIG. 3 illustrates additional implementation details 300 of the proposed scheme in accordance with the present disclosure. As shown in FIG. 3, in some implementations, the minimum SIC-guardband may be explicitly configured on a per carrier basis (e.g., case 1) rather than on a per bandwidth part (BWP) basis (e.g., case 2). However, in other implementations, the minimum SIC-guardband may be explicitly configured on a per BWP basis to override the per carrier option. The explicit configuration of the minimum SIC-guardband on a per BWP basis is suited for use with a carrier that has a DUD carrier frequency partitioning in which the bandpass filter can be changed for a low/pass filter. In some instances, different minimum SIC-guardband configurations may be applied per physical uplink control channel (PUCCH) and per physical uplink shared channel (PUSCH), or for different transmission bandwidth (TxBW). Accordingly, the TxBW may influence the selection of a particular minimum SIC-guardband by the scheduler of the network node.

In additional implementations, the UE may report limitations on the receive (Rx) allocation bandwidth and/or transmit (Tx) allocation bandwidth in the SBFD operation, such as a maximum Tx allocation bandwidth and/or a maximum Rx allocation bandwidth for the SBFD operation with respect to the UE. For example, the reporting may occur when radio frequency (RF) isolation of TX has a notch-like frequency selectivity characteristic at the TX RBs. In another example, the reporting may occur when RX gain has a peak-like frequency selectivity characteristic at the RX RBs. In one instance, the reported limitation may be applicable to a Tx bandwidth that includes Tx frequency hopping.

Figure 4:
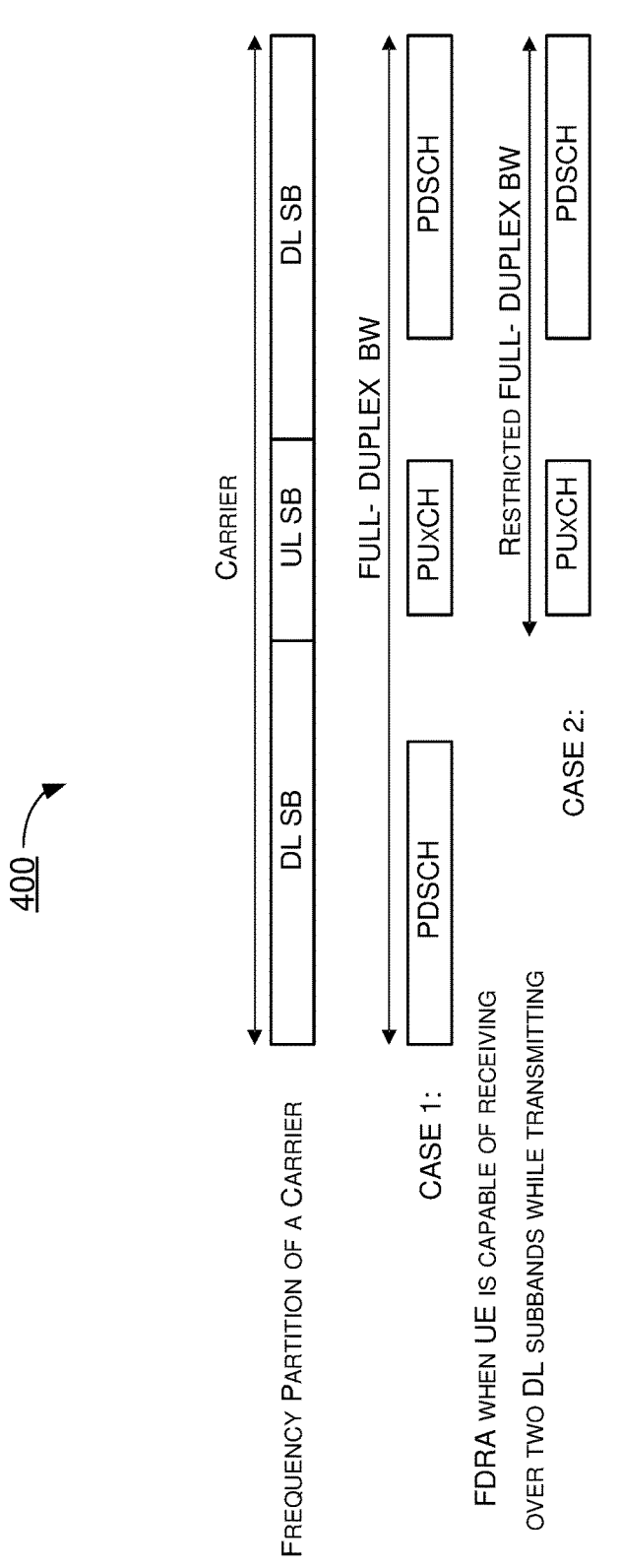
FIG. 4 illustrates a second aspect of the example proposed scheme in accordance with the present disclosure.

FIG. 4 illustrates a second aspect 400 of the example proposed scheme in accordance with the present disclosure. In some UE implementations, a UE may apply filters that isolate TX from RX, in which the filtering is limited to a single transition from high gain to high attenuation frequency regions. Alternatively, the filtering may include multiple transitions that degrade performance, such as when a filter has band-pass characteristics. As shown in FIG. 4, for these UE implementations as well as other applicable UE implementations, the UE may report whether the UE can support receiving over two non-contiguous Rx RB allocations located in two different DL subbands while simultaneously transmitting on a Tx RB allocation in a UL subband located in the middle of a DUD carrier frequency partition (e.g., case 1). In some instances, the UE may separately report a scenario in which one of the two DL subbands in a DUD carrier frequency partition is arbitrarily selected for reception by the Rx RB allocation with simultaneous transmission allocated in the UL subband, in which the transmission overlaps with the reception on at least one symbol. In other instances (e.g., case 2), the UE may report which DL subband of the DUD carrier frequency partition can be used in full-duplex mode. Alternatively, the network node may freely select the DL subband useable in full-duplex mode. In additional instances, the UE may report any performance penalty that occurs (e.g., in maximum Tx Power of Rx sensitivity) as a result of any non-contiguous RX RB allocations or non-contiguous DL subbands.

Figure 5:
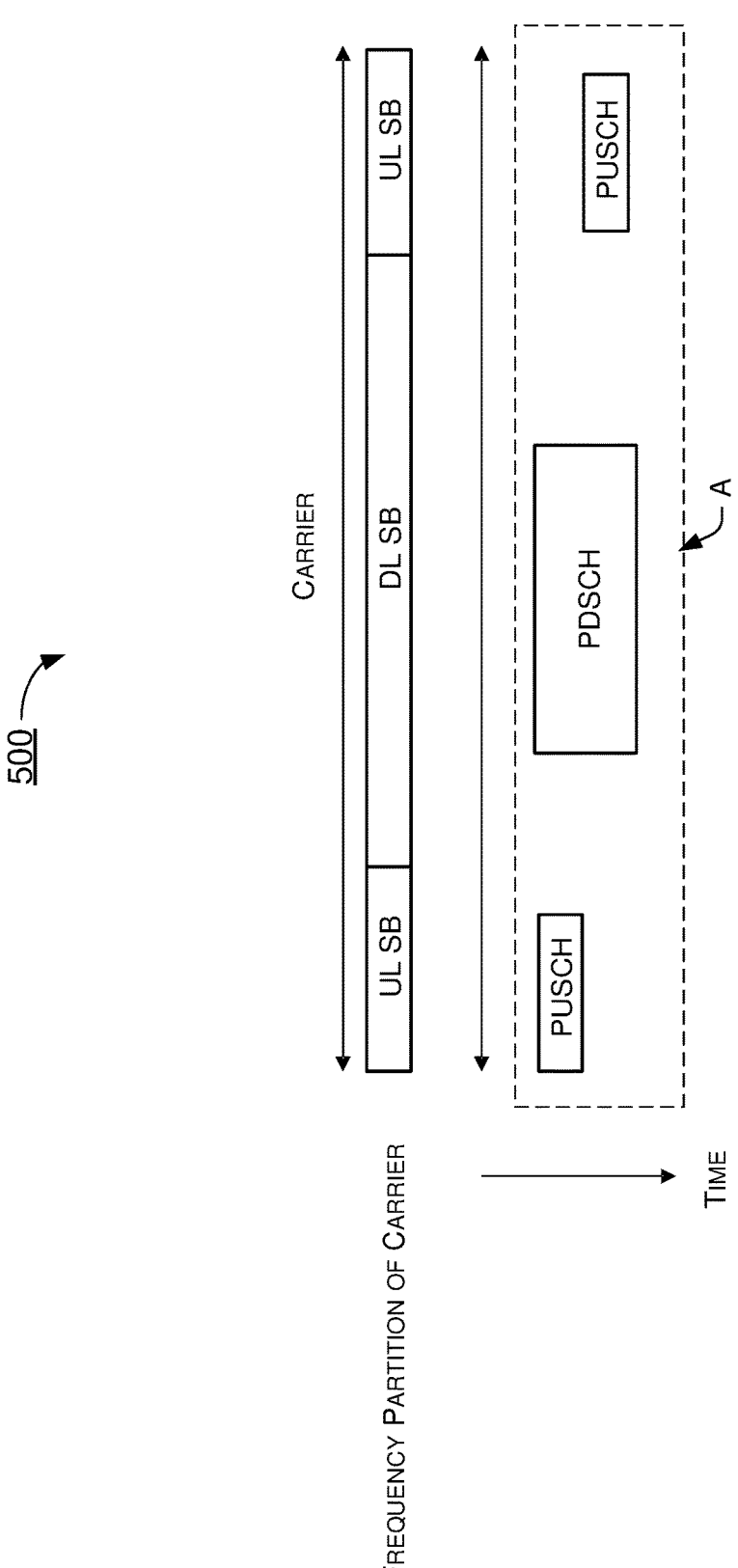
FIG. 5 illustrates a third aspect of the example proposed scheme in accordance with the present disclosure.

FIG. 5 illustrates a third aspect 500 of the example proposed scheme in accordance with the present disclosure. In some UE implementations, a UE may apply filters that isolate Tx from Rx, in which the filtering is limited to a single transition from high gain to high attenuation frequency regions. For these UE implementations as well as other applicable UE implementations, the UE may report whether the UE can support reception in a DL subband of a UDU carrier frequency partition while simultaneously transmitting a UL using frequency hopping between two UL subbands. For example, as shown in Part (A) of FIG. 5, a first part of a PUSCH may be transmitted on a first UL subband. After this transmission, a second part of the PUSCH may frequency hop onto a second UL subband that is separated from the first UL subband by a DL subband. Meanwhile, a physical downlink shared channel (PDSCH) may be transmitted over a DL SB that overlaps with the two UL subbands. In some instances, the UE may further report any performance penalty that is associated with the frequency hopping. For example, performance penalty may take the form of Tx power limitation, degradation in Rx sensitivity, etc.

Figure 6:
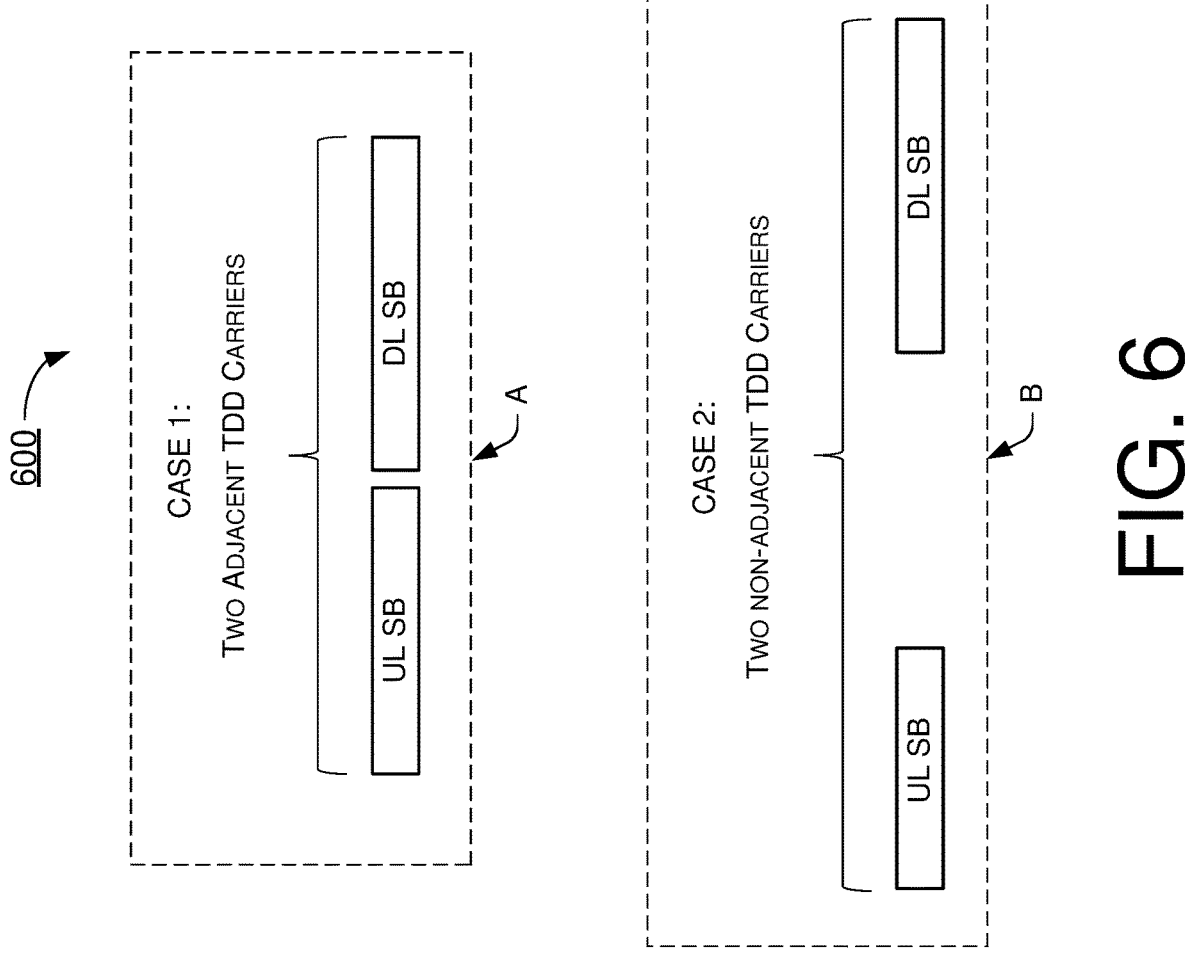
FIG. 6 illustrates a fourth aspect of the example proposed scheme in accordance with the present disclosure.

FIG. 6 illustrates a fourth aspect 600 of the example proposed scheme in accordance with the present disclosure. In some UE implementations, multiple time division duplex (TDD) carriers may be used for communication between a UE and the network node, in which one carrier is used for intra-band full-duplex transmission and another carrier is used for reception. For example, as shown in Part (A) of FIG. 6, there are two adjacent TDD carriers with a minimum SIC-guardband between the two carriers. The two carriers may operate in a time duplex fashion, in which the UL and DL configurations of these carriers are not synchronized. Thus, for a given symbol, one of the carriers is used for uplink and the other carrier is used for downlink. However, if the two carriers are used in a multi-carrier operation mode, then the entire frequency region that is available to a UE may be partitioned between a UL subband and a downlink subband. Likewise, Part (B) shows two non-adjacent TDD carriers in a similar scenario, in which there is a larger gap between them. In such UE implementations, the UE may report any additional frequency separation needed for the minimum SIC-guardband between the two TDD carriers. For example, the additional separation frequency may be reported per carrier configuration of one of the selected carriers, such as a carrier with a lowest index).

Furthermore, in some full-duplex feasibility reporting, it may be useful to define the parameters for an uplink allocation that can be transmitted even when an original transmission needs to be dropped to prioritize half-duplex reception. In other words, when there is an original allocation that cannot be transmitted, part of this original allocation that is truncated in frequency may still be transmitted. For example, when PUCCH is multiplexed onto PUSCH and the PUSCH cannot be transmitted, the multiplexing may be undone so that PUCCH can be transmitted without the PUSCH. In other words, a UE may switch back to transmitting PUCCH even when no PUSCH can be transmitted.

Figure 7:
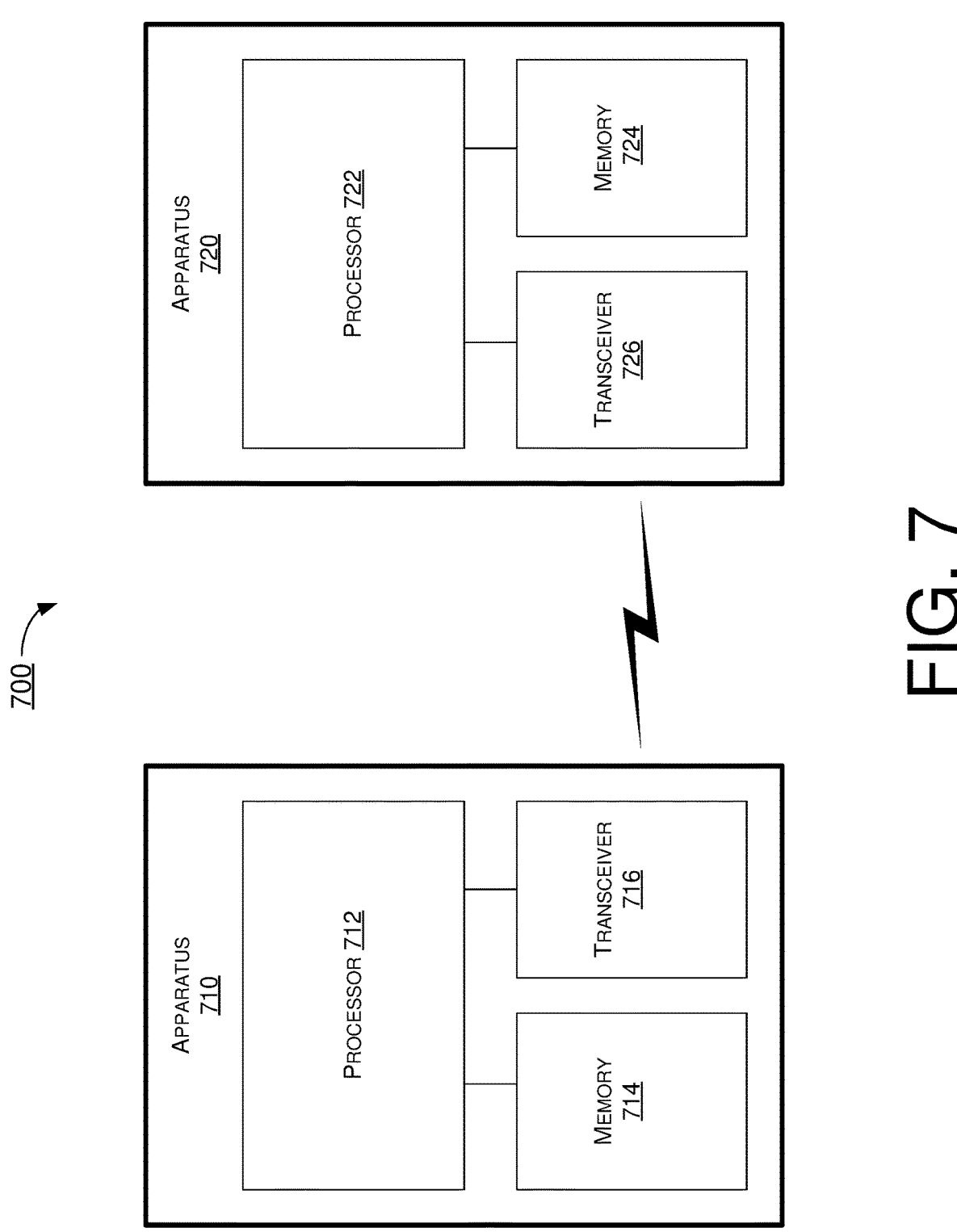
FIG. 7 is a block diagram of an example communication system in accordance with an implementation of the present disclosure.

Thus, for such full-duplex feasibility reporting in such a scenario, the parameters in the full-duplex feasibility reporting by a UE may include a parameter that restricts the switch back to a long PUCCH format to minimize transmission power. The parameters may further include a parameter indicating that no frequency hopping is permitted for the PUCCH to ensure a relatively small transmission bandwidth. Other parameters may constrain the FDRA to ensure a SIC-GB/TX-BW ratio is less than a predetermined bound, such as less than 4, or indicate that the UE can sacrifice power consumption. Such a sacrifice in power consumption may result in a high error vector magnitude (EVM) or cause other measured degradations in UE performance, but this may be tolerated as this scenario does not occur frequently. Illustrative Implementations FIG. 7 illustrates an example communication system 700 having at least an example apparatus 710 and an example apparatus 720 in accordance with an implementation of the present disclosure. Each of apparatus 710 and apparatus 720 may perform various functions to implement schemes, techniques, processes and methods described herein pertaining to techniques for UE configuration and scheduling in SBFD networks, including the various schemes described above with respect to various proposed designs, concepts, schemes, systems and methods described above, including network environment 100, as well as processes described below.

Each of apparatus 710 and apparatus 720 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 710 and apparatus 720 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 710 and apparatus 720 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 710 and apparatus 720 may be implemented in a smart thermostat, a smart fridge, a smart door lock, a wireless speaker or a home control center. When implemented in or as a network apparatus, apparatus 710 and/or apparatus 720 may be implemented in an eNodeB in an LTE, LTE-Advanced or LTE-Advanced Pro network or in a gNodeB or TRP in a 5G network, a B5G network, an NR network or an IoT network.

In some implementations, each of apparatus 710 and apparatus 720 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 710 and apparatus 720 may be implemented in or as a network apparatus or a UE. Each of apparatus 710 and apparatus 720 may include at least some of those components shown in FIG. 7 such as a processor 712 and a processor 722, respectively, for example. Each of apparatus 710 and apparatus 720 may further include one or more other components not pertinent to the proposed scheme of the present disclosure (e.g., internal power supply, display device and/or user interface device), and, thus, such component(s) of apparatus 710 and apparatus 720 are neither shown in FIG. 7 nor described below in the interest of simplicity and brevity.

In one aspect, each of processor 712 and processor 722 may be implemented in the form of one or more single-core processors, one or more multi-core processors, or one or more CISC or RISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged, and configured to perform specific tasks including those pertaining to techniques for UE configuration and scheduling in SBFD networks in accordance with various implementations of the present disclosure.

In some implementations, apparatus 710 may also include a transceiver 716 coupled to processor 712. Transceiver 716 may be capable of wirelessly transmitting and receiving data. In some implementations, transceiver 716 may be capable of wirelessly communicating with different types of wireless networks of different radio access technologies (RATs). In some implementations, transceiver 716 may be equipped with a plurality of antenna ports (not shown) such as, for example, four antenna ports. That is, transceiver 716 may be equipped with multiple transmit antennas and multiple receive antennas for multiple-input multiple-output (MIMO) wireless communications. In some implementations, apparatus 720 may also include a transceiver 726 coupled to processor 722. Transceiver 726 may include a transceiver capable of wirelessly transmitting and receiving data. In some implementations, transceiver 726 may be capable of wirelessly communicating with different types of UEs/wireless networks of different RATs. In some implementations, transceiver 726 may be equipped with a plurality of antenna ports (not shown) such as, for example, four antenna ports. That is, transceiver 726 may be equipped with multiple transmit antennas and multiple receive antennas for MIMO wireless communications.

In some implementations, apparatus 710 may further include a memory 714 coupled to processor 712 and capable of being accessed by processor 712 and storing data therein. In some implementations, apparatus 720 may further include a memory 724 coupled to processor 722 and capable of being accessed by processor 722 and storing data therein. Each of memory 714 and memory 724 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 714 and memory 724 may include a type of read-only memory (ROM) such as mask ROM, programmable ROM (PROM), erasable programmable ROM (EPROM) and/or electrically erasable programmable ROM (EEPROM). Alternatively, or additionally, each of memory 714 and memory 724 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 710 and apparatus 720 may be a communication entity capable of communicating with each other using various proposed schemes in accordance with the present disclosure. For illustrative purposes and without limitation, a description of capabilities of apparatus 710, as a UE (e.g., UE 110), and apparatus 720, as a network node (e.g., network node 126 or another network node implementing one or more network-side functionalities described above) of an application server side network (e.g., network 130 as a 5G/NR/B5G mobile network), is provided below.

In some proposed schemes in accordance with the present disclosure pertaining to techniques for UEs to report hard constraints on full-duplex scheduling to network nodes, processor 712 of apparatus 710, implemented in or as a UE (e.g., UE 110) may establish full-duplex communication between the apparatus 710 and the network node such that the apparatus 710 is able to transmit data to the network node and receive data from the network node simultaneously in time. For example, the processor 712 of the apparatus 710 may exchange data with the processor 722 of the apparatus 720 to establish the full-duplex communication. Subsequently, the processor 712 may report to the network node one or more hard constraints on a full-duplex scheduling of communication resources that is performed by the network node for the apparatus 710 during the full-duplex communication. In turn, the network node may apply the one or more hard constraints to the full-duplex scheduling of communication resources for the UE.

In some implementations, the processor 712 may report one or more minimum SIC-guardband configuration options for separating an uplink bandwidth allocation of a carrier for data transmission by the UE from a downlink bandwidth allocation of the carrier for data reception by the UE, and wherein parameters of each minimum SIC-guardband configuration options include a size of a minimum SIC-guardband and a starting position of the minimum SIC-guardband.

In other implementations, the processor 712 may report one or more subband full duplex (SBFD)-UE capability classes that the UE belongs to, the one or more SBFD-UE classes include: (1) a first UE class that specifies a predetermined minimum SIC-guardband necessary for the UE in full-duplex operation; (2) a second UE class that specifies a predetermined maximum transmission bandwidth necessary for the UE in full-duplex operation; (3) a third UE class that specifies a predetermined maximum combined bandwidth of full-duplex operation; and (4) a fourth UE class that specifies at least one of a predetermined minimum SIC-guardband, a maximum transmission bandwidth requirement, or a maximum receive bandwidth requirement with respect to a specified admissible transmit power for which a signal-to-Interference-plus-noise ratio (SINR) loss target is met with confidence.

In additional implementations, the processor 712 may report at least one of a maximum transmission allocation bandwidth or a maximum receive allocation bandwidth for the UE. The processor 712 may further report at least one of a limitation on a bandwidth of the receive allocation or a limitation on a bandwidth of the transmission allocation for a SBFD operation by the network node.

In further implementations, the processor 712 may report one or more of: whether the UE can support receiving over two non-contiguous receive resource block allocations located in two different downlink (DL) subbands while simultaneously transmitting on a transmit resource block allocation in an uplink (UL) subband located in a middle of a downlink-uplink-downlink (DUD) carrier frequency partition; a scenario in which one of the two DL subband in a DUD carrier frequency partition is arbitrarily selected for reception by the receive resource block allocation with simultaneous transmission allocated in the UL subband, in which the transmission overlaps with the reception on at least one symbol; which DL subband of the DUD carrier frequency partition can be used in full-duplex mode; or any performance penalty that occurs as a result of any non-contiguous receive resource block allocations or non-contiguous DL subbands.

In still other implementations, the processor 712 may report one or more of whether the UE can support reception in a downlink (DL) subband of an uplink-downlink-uplink (UDU) carrier frequency partition while simultaneously transmitting in an uplink (UL) using frequency hopping between two UL subbands, or any performance penalty that is associated with the frequency hopping.

In still further implementations, the processor 712 may report an additional frequency separation needed for a minimum SIC-guardband between multiple time division duplex (TDD) carriers that are used for communication between the UE and the network node.

In still more implementations, the processor 712 may report, when an uplink allocation is to be transmitted even when an original transmission needs to be dropped to prioritize half-duplex reception, one or more of a parameter that restricts a switch back to a long physical uplink control channel (PUCCH) format to minimize transmission power, a parameter indicating that no frequency hopping is permitted for the PUCCH, a parameter that ensures a SIC-guard-band/transmission bandwidth (TX-BW) ratio is less than a predetermined bound, or a parameter that indicates the UE can increase power consumption.

Illustrative Process

FIG. 8 is a flowchart of an example process 800 in accordance with an implementation of the present disclosure. The process 800 may represent an aspect of implementing various proposed designs, concepts, schemes, systems, and methods described above, whether partially or entirely, including those pertaining to those described above. More specifically, the process 800 may represent an aspect of the proposed concepts and schemes pertaining to techniques for UEs to report hard constraints on full-duplex scheduling to network nodes. The process 800 may include one or more operations, actions, or functions as illustrated by one or more blocks. Although illustrated as discrete blocks, various blocks of each process may be divided into additional blocks, combined into fewer blocks, or eliminated, depending on the desired implementation. Moreover, the blocks/sub-blocks of each process may be executed in the order shown in each figure or, alternatively in a different order. Furthermore, one or more of the blocks/sub-blocks of each process may be executed iteratively. The process 800 may be implemented by or in apparatus 710 and apparatus 720 as well as any variations thereof. Solely for illustrative purposes and without limiting the scope, the process 800 is described below in the context of apparatus 710 as a UE (e.g., UE 110) and apparatus 720 as a communication entity such as a network node or base station (e.g., network node 125 or another network node implementing one or more network-side functionalities described above) of an application server side network (e.g., network 130).

At 810, process 800 may include processor 712 of the apparatus 710, implemented in or as a UE (e.g., UE 110), establishing, at least using the processor 712, full-duplex communication between the UE and a network node such that the UE is able to transmit data to the apparatus 720 implemented in or as a network node (e.g., network node 125) and receive data from the network node simultaneously in time. For example, the processor 712 of the apparatus 710 may exchange data with the processor 722 of the apparatus 720 to establish the full-duplex communication.

At 820, the process 800 may include the processor 712 reporting to the network node one or more hard constraints on a full-duplex scheduling of communication resources that is performed by the network node for the UE during the full-duplex communication. In turn, the network node may apply the one or more hard constraints to the full-duplex scheduling of communication resources for the UE.

In some implementations, the process 800 may include the processor 712 reporting one or more minimum SIC-guardband configuration options for separating an uplink bandwidth allocation of a carrier for data transmission by the UE from a downlink bandwidth allocation of the carrier for data reception by the UE, and wherein parameters of each minimum SIC-guardband configuration options includes a size of a minimum SIC-guardband and a starting position of the minimum SIC-guardband.

In some instances, the parameters of each minimum SIC-guardband configuration option further include a relative performance rating of a corresponding minimum SIC-guardband configuration relative to one or more other minimum SIC-guard configurations in one or more other minimum SIC guardband configuration options.

In other instances in which the reporting includes reporting multiple minimum SIC-guardband configuration options to the network node, the reporting may cause the network node to implicitly select one of the multiple minimum SIC guardband configuration options for implementation based at least on scheduling information of the uplink bandwidth allocation and the downlink bandwidth allocation.

In additional instances in which the reporting includes reporting multiple minimum SIC-guardband configuration options to the network node, the reporting may cause the network node to perform an intra-UE prioritization between the data transmission and the data reception when none of the multiple minimum SIC-guardband configuration options meets a scheduled frequency separation requirement for the uplink bandwidth allocation and the downlink bandwidth allocation.

In still other instances in which the reporting includes reporting multiple minimum SIC-guardband configuration options to the network node, the reporting may cause the network node to explicitly select one of the multiple minimum SIC guardband configuration options for implementation. In still other other instances, the minimum SIC-guardband is configured on a per carrier basis or a per bandwidth part (BWP) basis.

In other implementations, the process 800 may include the processor 712 reporting one or more subband full duplex (SBFD)-UE capability classes that the UE belongs to, in which the one or more SBFD-UE classes include: (1) a first UE class that specifies a predetermined minimum SIC-guardband necessary for the UE in full-duplex operation; (2) a second UE class that specifies a predetermined maximum transmission bandwidth necessary for the UE in full-duplex operation; (3) a third UE class that specifies a predetermined maximum combined bandwidth of full-duplex operation; and (4) a fourth UE class that specifies at least one of a predetermined minimum SIC-guardband, a maximum transmission bandwidth requirement, or a maximum receive bandwidth requirement with respect to a specified admissible transmit power for which a signal-to-Interference-plus-noise ratio (SINR) loss target is met with confidence.

In additional implementations, the process 800 may include the processor 712 reporting at least one of a maximum transmission allocation bandwidth or a maximum receive allocation bandwidth for the UE. The process 800 may further include the processor 712 reporting at least one of a limitation on a bandwidth of the receive allocation or a limitation on a bandwidth of the transmission allocation for a SBFD operation by the network node.

In further implementations, the process 800 may include the processor 712 reporting one or more of: whether the UE can support receiving over two non-contiguous receive resource block allocations located in two different downlink (DL) subbands while simultaneously transmitting on a transmit resource block allocation in an uplink (UL) subband located in a middle of a downlink-uplink-downlink (DUD) carrier frequency partition; a scenario in which one of the two DL subband in a DUD carrier frequency partition is arbitrary selected for reception by the receive resource block allocation with simultaneous transmission allocated in the UL subband, in which the transmission overlaps with the reception on at least one symbol; which DL subband of the DUD carrier frequency partition can be used in full-duplex mode; or any performance penalty that occurs as a result of any non-contiguous receive resource block allocations or non-contiguous DL subbands.

In still other implementations, the process 800 may include the processor 712 reporting one or more of whether the UE can support reception in a downlink (DL) subband of an uplink-downlink-uplink (UDU) carrier frequency partition while simultaneously transmitting in an uplink (UL) using frequency hopping between two UL subbands, or any performance penalty that is associated with the frequency hopping.

In still further implementations, the process 800 may include the processor 712 reporting an additional frequency separation needed for a minimum SIC-guardband between multiple time division duplex (TDD) carriers that are used for communication between the UE and the network node.

In still more implementations, the process 800 may include the processor 712 reporting, when an uplink allocation is to be transmitted even when an original transmission needs to be dropped to prioritize half-duplex reception, one or more of a parameter that restricts a switch back to a long physical uplink control channel (PUCCH) format to minimize transmission power, a parameter indicating that no frequency hopping is permitted for the PUCCH, a parameter that ensures a SIC-guardband/transmission bandwidth (TX-BW) ratio is less than a predetermined bound, or a parameter that indicates the UE can increase power consumption.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

establishing, at least via a user equipment (UE) full-duplex communication between the UE and a network node such that the UE is able to transmit data to the network node and receive data from the network node simultaneously in time; and reporting by the UE to the network node one or more hard constraints on a full-duplex scheduling of communication resources that is performed by the network node for the UE during the full-duplex communication, wherein the reporting includes reporting one or more minimum self-interference cancellation (SIC)-guardband configuration options for separating an uplink bandwidth allocation of a carrier for data transmission by the UE from a downlink bandwidth allocation of the carrier for data reception by the UE, and wherein parameters of each minimum SIC-guardband configuration options include a size of a minimum SIC-guardband and a starting position of the minimum SIC-guardband.

2. The method of claim 1, wherein the parameters of each minimum SIC-guardband configuration option further include a relative performance rating of a corresponding minimum SIC-guardband configuration relative to one or more other minimum SIC-guard configurations in one or more other minimum SIC guardband configuration options.

3. The method of claim 1, wherein the reporting includes reporting multiple minimum SIC-guardband configuration options to the network node, and wherein reporting causes the network node to implicitly select one of the multiple minimum SIC guardband configuration options for implementation based at least on scheduling information of the uplink bandwidth allocation and the downlink bandwidth allocation.

4. The method of claim 1, wherein the reporting includes reporting multiple minimum SIC-guardband configuration options to the network node, and wherein the reporting causes the network node to perform an intra-UE prioritization between the data transmission and the data reception when none of the multiple minimum SIC-guardband configuration options meets a scheduled frequency separation requirement for the uplink bandwidth allocation and the downlink bandwidth allocation.

5. The method of claim 1, wherein the reporting includes reporting multiple minimum SIC-guardband configuration options to the network node, and wherein the reporting causes the network node to explicitly select one of the multiple minimum SIC guardband configuration options for implementation.

6. The method of claim 1, wherein the minimum SIC-guardband is configured on a per carrier basis or a per bandwidth part (BWP) basis.

7. The method of claim 1, wherein the reporting includes reporting one or more subband full duplex (SBFD)-UE capability classes that the UE belongs to, the one or more SBFD-UE classes include: (1) a first UE class that specifies a predetermined minimum SIC-guardband necessary for the UE in full-duplex operation; (2) a second UE class that specifies a predetermined maximum transmission bandwidth necessary for the UE in full-duplex operation; (3) a third UE class that specifies a predetermined maximum combined bandwidth of full-duplex operation; and (4) a fourth UE class that specifies at least one of a predetermined minimum SIC-guardband, a maximum transmission bandwidth requirement, or a maximum receive bandwidth requirement with respect to a specified admissible transmit power for which a signal-to-Interference-plus-noise ratio (SINR) loss target is met with confidence.

8. The method of claim 1, wherein the reporting includes reporting at least one of a maximum transmission allocation bandwidth or a maximum receive allocation bandwidth for the UE.

9. The method of claim 1, wherein the reporting includes reporting at least one of a limitation on a bandwidth of the receive allocation or a limitation on a bandwidth of the transmission allocation for a subband full duplex operation by the network node.

10. The method of claim 1, wherein the reporting includes reporting one or more of: whether the UE can support receiving over two non-contiguous receive resource block allocations located in two different downlink (DL) subbands while simultaneously transmitting on a transmit resource block allocation in an uplink (UL) subband located in a middle of a downlink-uplink-downlink (DUD) carrier frequency partition; a scenario in which one of the two DL subband in a DUD carrier frequency partition is arbitrarily selected for reception by the receive resource block allocation with simultaneous transmission allocated in the UL subband, in which the transmission overlaps with the reception on at least one symbol; which DL subband of the DUD carrier frequency partition can be used in full-duplex mode; or any performance penalty that occurs as a result of any non-contiguous receive resource block allocations or non-contiguous DL subbands.

11. The method of claim 1, wherein the reporting includes reporting one or more of whether the UE can support reception in a downlink (DL) subband of an uplink-down-link-uplink (UDU) carrier frequency partition while simultaneously transmitting in an uplink (UL) using frequency hopping between two UL subbands, or any performance penalty that is associated with the frequency hopping.

12. The method of claim 1, wherein the reporting includes reporting an additional frequency separation needed for a minimum self-interference cancellation (SIC)-guardband between multiple time division duplex (TDD) carriers that are used for communication between the UE and the network node.

13. The method of claim 1, wherein the reporting includes reporting, when an uplink allocation is to be transmitted even when an original transmission needs to be dropped to prioritize half-duplex reception, one or more of a parameter that restricts a switch back to a long physical uplink control channel (PUCCH) format to minimize transmission power, a parameter indicating that no frequency hopping is permitted for the PUCCH, a parameter that ensures a SIC-guardband (SIC-GB)/transmission bandwidth (TX-BW) ratio is less than a predetermined bound, or a parameter that indicates the UE can increase power consumption.

14. An apparatus implementable in a network as a user equipment (UE), comprising:
a transceiver configured to communicate with one or more network nodes of the network; and
a processor coupled to the transceiver and configured to perform operations comprising:
establishing full-duplex communication between the UE and the network node such that the UE is able to transmit data to the network node and receive data from the network node simultaneously in time; and
reporting to the network node one or more hard constraints on a full-duplex scheduling of communication resources that is performed by the network node for the UE during the full-duplex communication,
wherein the reporting includes reporting one or more minimum self-interference cancellation (SIC)-guardband configuration options for separating an uplink bandwidth allocation of a carrier for data transmission by the UE from a downlink bandwidth allocation of the carrier for data reception by the UE, and
wherein parameters of each minimum SIC-guardband configuration options include a size of a minimum SIC-guardband and a starting position of the minimum SIC-guardband.

15. The apparatus of claim 14, wherein the parameters of each minimum SIC-guardband configuration option further include a relative performance rating of a corresponding minimum SIC-guardband configuration relative to one or more other minimum SIC-guard configurations in one or more other minimum SIC guardband configuration options.

16. The apparatus of claim 14, wherein the reporting includes reporting multiple minimum SIC-guardband configuration options to the network node, and wherein reporting causes the network node to implicitly select one of the multiple minimum SIC guardband configuration options for implementation based at least on scheduling information of the uplink bandwidth allocation and the downlink bandwidth allocation.

17. The apparatus of claim 14, wherein the reporting includes reporting multiple minimum SIC-guardband configuration options to the network node, and wherein the reporting causes the network node to perform an intra-UE prioritization between the data transmission and the data reception when none of the multiple minimum SIC-guardband configuration options meets a scheduled frequency separation requirement for the uplink bandwidth allocation and the downlink bandwidth allocation.

18. The apparatus of claim 14, wherein the reporting includes reporting multiple minimum SIC-guardband configuration options to the network node, and wherein the reporting causes the network node to explicitly select one of the multiple minimum SIC guardband configuration options for implementation.

* * * * *